(12) United States Patent
Pawar et al.

(10) Patent No.: US 8,234,230 B2
(45) Date of Patent: Jul. 31, 2012

(54) DATA CLASSIFICATION TOOL USING DYNAMIC ALLOCATION OF ATTRIBUTE WEIGHTS

(75) Inventors: Sachin Sharad Pawar, Maharashtra (IN); Girish Joshi, Maharashtra (IN)

(73) Assignee: Global eProcure, Clark, NJ (US)

( * ) Notice: Subject to any disclaimer, the term of this patent is extended or adjusted under 35 U.S.C. 154(b) by 566 days.

(21) Appl. No.: 12/459,367

(22) Filed: Jun. 30, 2009

(65) Prior Publication Data

US 2010/0332434 A1 Dec. 30, 2010

(51) Int. Cl.
*G06F 17/16* (2006.01)
*G06F 17/10* (2006.01)

(52) U.S. Cl. .......................... 706/45; 706/19
(58) Field of Classification Search ..................... 706/45
See application file for complete search history.

(56) References Cited

U.S. PATENT DOCUMENTS

| | | | |
|---|---|---|---|
| 6,647,374 | B2 | 11/2003 | Kansal |
| 7,003,490 | B1 | 2/2006 | Keyes |
| 7,212,996 | B1 | 5/2007 | Carnahan et al. |
| 7,433,840 | B2 | 10/2008 | Carnahan et al. |
| 2002/0013735 | A1 | 1/2002 | Arora et al. |
| 2002/0013760 | A1 | 1/2002 | Arora et al. |
| 2002/0032638 | A1 | 3/2002 | Arora et al. |
| 2002/0042769 | A1 | 4/2002 | Gujral et al. |
| 2002/0055900 | A1 | 5/2002 | Kansal |
| 2003/0014326 | A1 | 1/2003 | Ben-Meir et al. |
| 2005/0091147 | A1 | 4/2005 | Ingargiola et al. |
| 2005/0192865 | A1 | 9/2005 | Boutilier et al. |
| 2005/0283425 | A1 | 12/2005 | Grove et al. |
| 2006/0069635 | A1 | 3/2006 | Ram et al. |
| 2006/0167784 | A1 | 7/2006 | Hoffberg |
| 2006/0282368 | A1 | 12/2006 | Cai et al. |
| 2008/0052219 | A1 | 2/2008 | Sandholm et al. |

*Primary Examiner* — Jeffrey A Gaffin
*Assistant Examiner* — Nathan Brown, Jr.
(74) *Attorney, Agent, or Firm* — Brown Winick Law Firm

(57) ABSTRACT

An analysis tool for causing a computer to use information gain of attributes and a classification algorithm to classify new records in a set of data by taking into account the predictive value of the attributes and the effect of the new record.

15 Claims, 5 Drawing Sheets

FIGURE 1

| Vendor Name | GL Description | Category |
|---|---|---|
| COMPANY 1 | MRO NON-STOCK USAGE | OTHER/MISC EQUIPMENT |
| COMPANY 1 | CAPITAL PROJECT EXP | OTHER/MISC EQUIPMENT |
| COMPANY 1 | Spare Parts-SAP | OTHER/MISC EQUIPMENT |
| COMPANY 1 | MRO NON-STOCK USAGE | OTHER/MISC EQUIPMENT |
| COMPANY 2 | Spare Parts-SAP | CONVEYOR SUPPLIES |
| COMPANY 2 | MRO NON-STOCK USAGE | CONVEYOR SUPPLIES |
| COMPANY 2 | CAPITAL PROJECT EXP | POWER TRANSMISSION |
| COMPANY 2 | Spare Parts-SAP | POWER TRANSMISSION |

DATA CLASSIFICATION TOOL USING DYNAMIC ALLOCATION OF ATTRIBUTE WEIGHTS

FIELD OF THE INVENTION

The present invention relates generally to an analysis tool and, more specifically, to a computer readable medium having instructions that cause a processor to analyze data using information gain of attributes and a classification algorithm to classify new records in a set of data.

BACKGROUND OF THE INVENTION

There are a multitude of needs for means to classify items prospectively. For example, sorting incoming emails by content, sorting data records as new data is entered, analyzing spend information and predicting an outcome based on a new item's characteristics. One such example is related to on-line auctions.

In the last ten years, on-line auction capabilities, features, and functions have evolved at lightning speed. Nearly as popular as forward auctions (auctions where bidders enter higher bids in order to win the item or service sold by the seller), reverse auctions (auction where bidders enter lower bids to entice a buyer to select the item or service sold by the bidder) have become the procurement tool of choice in many industries.

It is typical that an on-line auction be conducted electronically. Each participant in an auction does so through a remote site. The participant typically sends information from its remote site via a communications network (e.g. a network services provider) to an auction coordinator at its own remote site; the coordinator sends information to the participant in the same manner. The auction is actually managed by a software application which usually includes a client component operating at the remote site of the participant and a server component which typically operates at the coordinator's remote site. The client component communicates the bids entered by the participant to the server component. The server component communicates updates about the auction to the client component. Most often the client component includes software used to connect to the server component, usually via telephone lines or the internet.

The entity wishing to purchase services or items from suppliers may employ a service to manage auctions on its behalf or may employ special tools to assist with the management of its auctions. The service may employ tools that provide means to separate and select possible participants. For example, the auction holder may be allowed to specifically designate certain suppliers it wishes the service to invite to the auction or to provide certain requirements for eligibility of suppliers which the service applies to determine the group of invitees. Often, such services use tools that store information about past participants, both buyers and sellers, making the group of invitees simple to select based on the physical location of the past participants or on its inventory or offerings. Further, stored information can be used to assess the likely participation of a particular supplier and may even be applied to set a prebid ceiling or floor for that supplier based on its prior bidding behavior. It is not unusual to allow the entity wishing to purchase to set reserve prices, or to enter particular bid ceilings for a particular supplier with whom it has done business in the past or is the present incumbent.

With all of the auctions being conducted, those hosting the auctions i.e. the buyers need to have tools that also assist them in analysis of the past and for prediction of the future relative to data previously collected and new data coming in. Further, all businesses whether they use electronic auctions to acquire supplies and services or not, have a need for specific analysis and reporting regarding their spend. Specifically, those entities that procure services and goods from many different suppliers need tools to assist them in analyzing what, how, and where they spend. Most companies have multiple enterprise transaction systems and lack the tools and processes to properly aggregate, cleanse, normalize and monitor their spend with multiple vendors at the line item level. This problem is particularly severe in the case of indirect goods and services, which typically bring a broader set of suppliers and considerably more transactions. Without having access to accurate, detailed spend data, organizations are unable to effectively source quality products and services at the best possible prices. What is needed is a solution that helps clients attain full visibility into their spend, better understand where savings opportunities exist, and how to best achieve the savings.

Another such example would include the need to sort and classify incoming emails. Accurate sorting can result in time savings as well as enhanced safety of a system. Being able to recognize spam accurately versus business or personal or enewsletters or desired emarketing would provide a level of efficiency related to email heretofore never provided.

A record in a data set collected from a purchase, or an incoming email, typically includes several attributes or categories of data. One can look at that data set in many ways in order to discern some pattern or to learn what that data means. However, attributes in such data sets are often assigned a weight by the analyst according to a perceived level of importance the analyst believes that attribute may have in the data or that the analyst wishes to be able to use as a sorting factor in the set. Alternatively, the data itself may be considered in order to determine which attributes appear to have predictive value relative to other attributes. In either case, once an attribute is so analyzed it is assigned a weight and that weight is applied to incoming and new data.

While each of the aforementioned approaches has its value, neither takes into account the effect of a new record and, more particularly, on the weight or predictive value of any attribute. Therefore, left on the table is a significant level of informative data; the difference between a system that takes into consideration new record values relative to those already present as opposed to a static system.

It is, therefore, one objective of the present invention to provide a tool for analyzing the predictive value of the attributes in records of a data set;

It is another objective of the invention to provide a computer readable medium that, when employed by a computer's processor, analyzes the attributes and values of the attributes in a given set of data to obtain static weight or importance of each. Thereafter, the computer's processor varies those static weights or importance according to the values of those same attributes in a new record and readjusts that analysis as additional values are obtained from new records;

It is a third objective of the invention to provide a tool that can be used to analyze data and provide reports regarding where money is spent across various aspects of a business, particularly at a line item level and in real-time.

It is a fourth objective of the invention to provide a tool that can be used to analyze data and classify new data records into different classifications according to the new records attribute weights and dynamically adjusted attribute weights of the previously collected data.

It is a fifth objective of the invention to provide a tool that can be used to analyze, classify and sort incoming emails to provide an efficient means of prioritizing emails for the recipient.

SUMMARY OF THE INVENTION

The classification tool of the present invention addresses the problems left unsolved by other systems. The present invention is an approach that includes 1) collecting comprehensive data from disparate sources 2) cleansing, reconciling, and aggregating the data 3) classifying the data into sourceable categories 4) and reporting the analysis and findings to the decision makers.

In its most general form, the present invention determines the importance of each attribute by analyzing the pre-classified data. These are static weights of the attributes. Then, based on importance of each value within each attribute, it determines the interval of variation about the static weight of the attribute. Next, for the record to be classified, it determines the dynamic weight for each attribute depending upon the actual values of those attributes. Finally the present invention transforms the dynamic weights of the attributes into a prediction used to classify the new record.

The present invention provides a way for its users to see accurate spend information at the aggregate and line item level for use in making time-sensitive decisions, perform spend analysis quickly and without dedication of additional resources, obtain visibility into how much money is spent with whom, for what, and how frequently, rationalize and standardize products and services, identify high performance suppliers and consolidate business to these high performance suppliers, monitor vendor compliance with contracted pricing and identify spend leakage, consolidate spend across various business units to increase leverage in supplier negotiations, identify and reduce maverick spend, identify product and service categories with the greatest savings potential, and understand key price trends and variances. Spend analysis by business unit, geography, category, vendor, price variance, etc. are available through the tool.

The present invention includes instructions that, when read by a computer's processor, analyzes the pre-classified data in the system and applies a classification algorithm to transform that data and assign a new record to a particular classification. Examples of such algorithms include posterior probability analysis, nearest neighborhood algorithms, and support vector machine.

Posterior probability may be used relative to new data is a revised probability that takes into account new available information. For example, let there be two containers, container A having 5 black marbles and 10 red marbles and container B having 10 black balls and 5 red balls. If a container is selected at random, the probability that container A is chosen is 0.5. This is the a priori probability. If we are given an additional piece of information that a ball was drawn at random from the selected container, and that ball was black, then using posterior probability calculations we can determine the probability that the container from which it was drawn is container A. Posterior probability takes into account this additional information and revises the probability downward from 0.5 to 0.333 according to Bayes' theorem, because a black ball is more probable from container B than container A.

The tool of the present invention first analyzes various values of attributes within a data set and then applies posterior probability to classify a new record. One way of looking at the data set is by analyzing and employing the analysis of an information gain of attribute. According to Information Theory, the information gain associated with an attribute is equal to the reduction in overall entropy of the system due to knowledge about that particular attribute and can be employed to assist in classifying a new record.

At its most basic, the instructions of the present invention cause the computer to look at a particular pre-classified data set which includes records. Each record consists of a plurality of attributes or categories. A first attribute may have more predictive value than a second attribute but a third attribute may have more predictive value than the first attribute. The instructions cause the computer to assign to each of the attributes a static weight relative to their respective predictive values by calculating entropy of the data set, conditional entropy for each value of the attribute, transforming conditional entropy into information gain of the attribute and thereafter normalizing the information gain values.

Further, each attribute can be described by several different descriptors. Each descriptor of an attribute may have a different predictive value relative to a descriptor of another attribute or relative to another description of the same attribute. Taking into account the variation of the descriptors around the attributes creates a dynamic weight for each attribute. Moreover, each time a new record is entered into the set having new values for each attribute, the dynamic weight of each attribute will change. Therefore, an interval of variation about the attribute caused by the values of that attribute must be considered and used in a determination of the dynamic weight of an attribute. The invention instructs the computer to determine the interval of variation by first determining conditional entropy of each of the values for a particular attribute in the data set and transforming these values by inversion to obtain attribute importance. Next, these values are divided into quartiles and upper and lower boundary scaling factors are obtained which are then applied to find the upper bound and lower bound of the interval of variation of that attribute.

The invention next provides a set of instructions to cause the computer to determine the dynamic weight of an attribute value in a particular record, specifically a record that is to be classified. For each attribute value in the new record, the conditional entropy in the data set is calculated for that value of the current attribute and the conditional entropy value is then transformed to obtain an Attribute value importance score. The attribute value importance score is then linearly transformed in the interval of variation for that attribute. Once the attribute value importance score for each attribute has been linearly transformed, they are normalized resulting in a dynamic weight measure for each attribute. Thereafter, the new record is assigned to a classification in light of the dynamic weight of each attribute value. Employing posterior probability analysis, the dynamic weight of each attribute is used as an exponent of corresponding likelihood probability value in Naïve Bayes classification. The dynamic weight values could also be used in a Nearest Neighborhood algorithm which finds the nearest neighbor according to distance. The dynamic weight values would be used in a distance calculation. Alternatively, the dynamic weight values may be employed by a Support Vector Machine which operates on the premise of finding a hyper-plane with maximum width and then uses that hyper-plane for classification. Here, the dynamic weight values would be used to determine the distance of the new record from the hyper-plane.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 1 is a table providing a data set;

DETAILED DESCRIPTION

Figure 2:
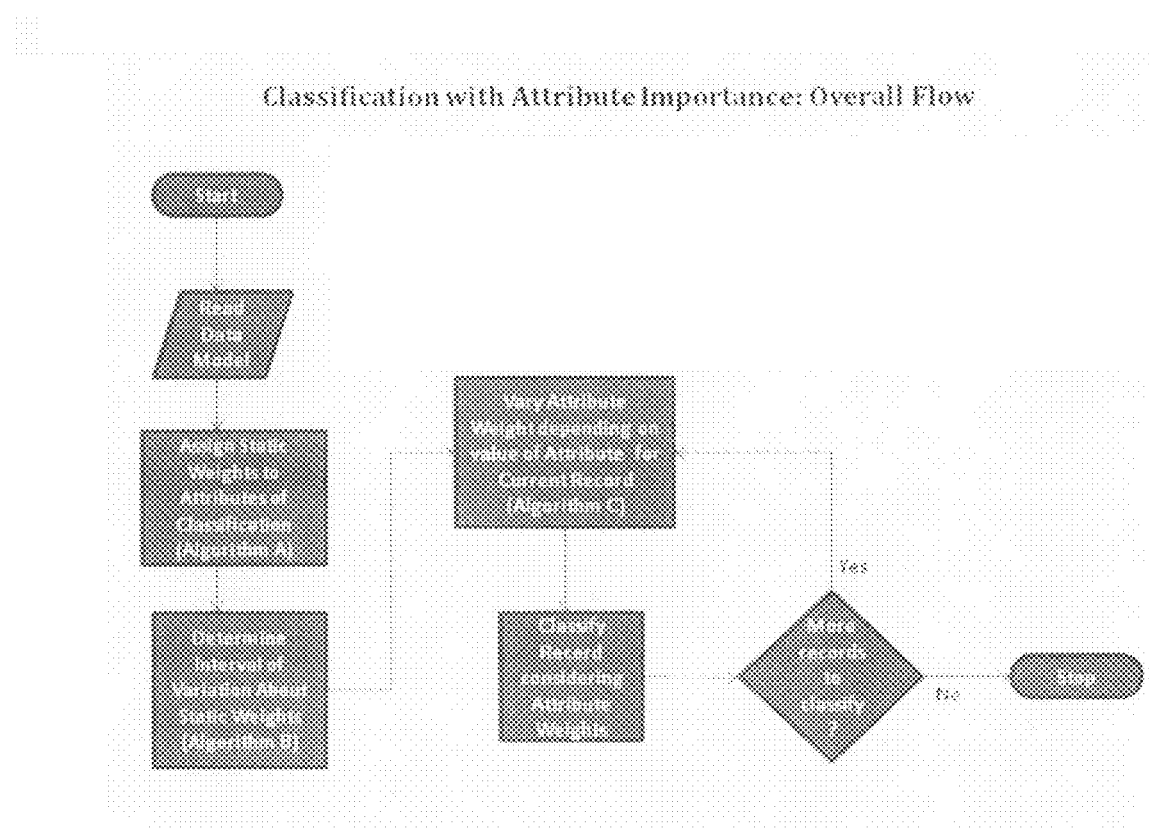
FIG. 2 is a flowchart of overall flow of the classification process.
Figure 3:
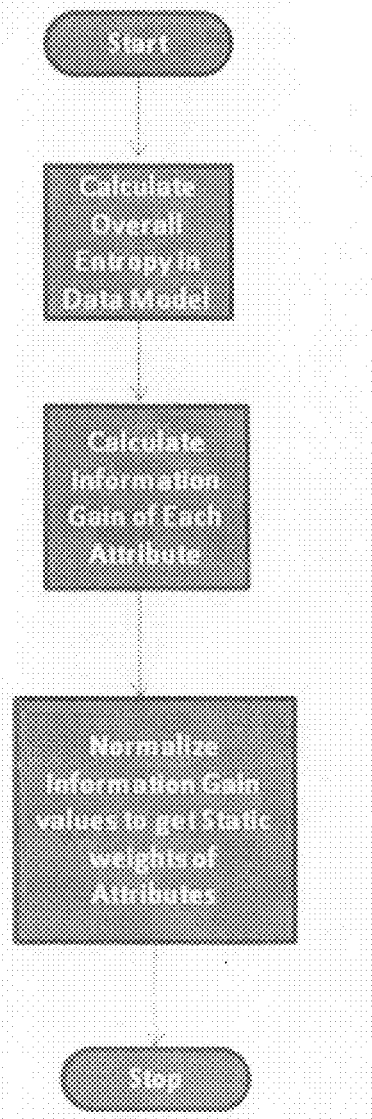
FIG. 3 is a flowchart of process by which static weights are assigned to attributes.
Figure 4:
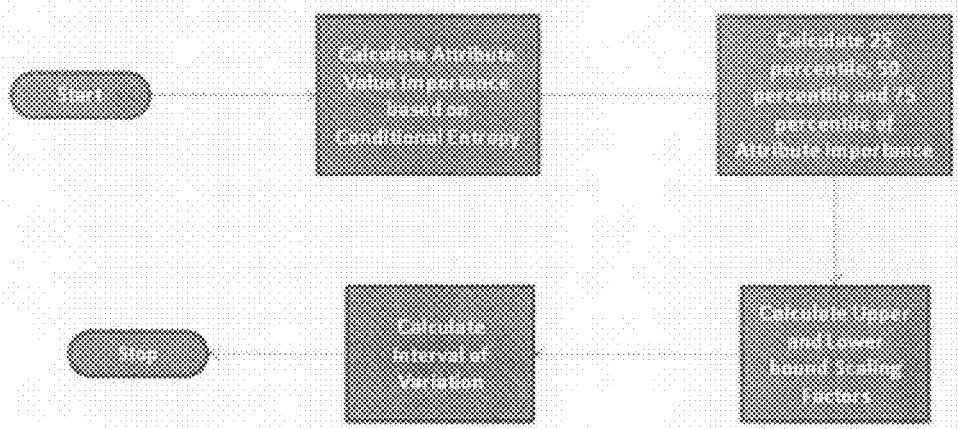
FIG. 4 is a flowchart of process to find the interval of a variation of attributes of classification.
Figure 5:
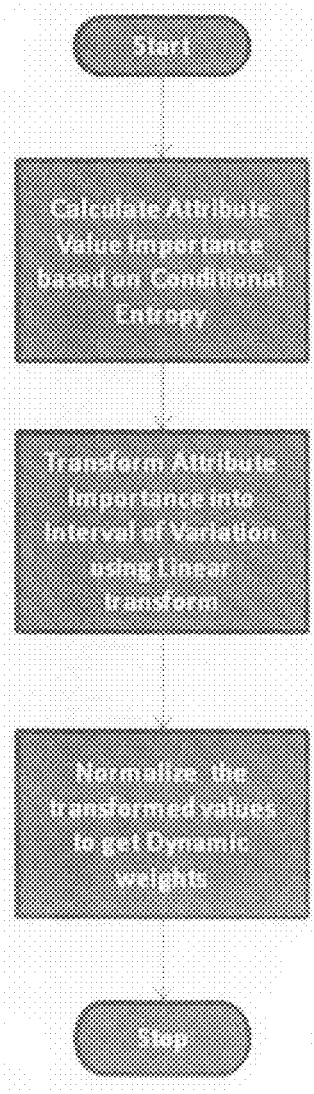
FIG. 5 is a flowchart of process to assign dynamic weights to attributes of record to be classified.

This computer readable medium 10 of the present invention comprises instructions 12 for a processor 13 that cause a computer 14 to make use of a pre-classified data set 16 (see FIG. 1). Data set 16 comprises a plurality of records 18 and that includes a plurality of attributes 20-21 wherein each of said plurality of attributes 20-21 for each record 18 may include one of a plurality of descriptors 32-33 and 24-26 for that attribute 20-21. The computer 14 is also instructed to make use of a new record 40 to be classified. Generally, during classification, each attribute 20-21 is considered to be of equal importance. However, it is logical that the importance of attributes 20-21 in deciding the classification may vary depending on distribution of the attribute descriptors 32-33 and 24-26 across the pre-classified data set and also depending on the attribute descriptors in the record 40 to be classified.

An importance to an attribute 20-21 is typically translated into a weight assigned to that attribute. Traditionally equal weights have been assigned to attributes resulting in Static Weight Allocation; however, varying the weights (Dynamic Allocation of Weights) depending on the record to be classified, improves overall classification results. Thus for different records, attributes play a role in accordance with their importance (or weights).

Example: As an example to illustrate this, consider the following said data set:

| Vendor Name | GL Description | Category |
|---|---|---|
| COMPANY 1 | MRO NON-STOCK USAGE | OTHER/MISC EQUIPMENT |
| COMPANY 1 | CAPITAL PROJECT EXP | OTHER/MISC EQUIPMENT |
| COMPANY 1 | Spare Parts-SAP | OTHER/MISC EQUIPMENT |
| COMPANY 1 | MRO NON-STOCK USAGE | OTHER/MISC EQUIPMENT |
| COMPANY 2 | Spare Parts-SAP | CONVEYOR SUPPLIES |
| COMPANY 2 | MRO NON-STOCK USAGE | CONVEYOR SUPPLIES |
| COMPANY 2 | CAPITAL PROJECT EXP | POWER TRANSMISSION |
| COMPANY 2 | Spare Parts-SAP | POWER TRANSMISSION |

Looking at the data, we can observe that knowledge of Vendor Name 20 for this record set plays a more deciding role with certainty of the Category 22 by a larger amount than the knowledge of GL Description 21. Thus we can claim that Vendor Name 20 attribute has more importance for deciding Category 22, than GL Description 21.

Going further, the case where Vendor Name 20 has value of "Company 1" 32 is different than the case where Vendor Name 20 has value of "Company 2" 33. In the earlier case, Vendor Name 20 alone can decide Category 22, whereas in later case Vendor Name 20 alone is not sufficient for the decision. Thus the importance of Vendor Name 20 attribute is different in either of these cases.

One mechanism to achieve the advantages of dynamic allocation of weight is by using information gain of attributes. In the Information Theoretic sense, information gain 80 of an attribute 20-21 is equal to the reduction in overall entropy of the system due to knowledge of particular attribute 20-21. The more the information gain 80, the more important is the attribute 20-21. This results in static weights 50-51 (or fixed importance) to the attributes 20-21. Then, for every new record 40 to classify, the present invention takes into account the importance of attribute values 32-33 and 24-26 and varies the corresponding static weights 50-51 (or fixed importance), thus assigning the weights dynamically 62-63 to every attribute 20-21 of classification. Based on these dynamic weights 62-63, a new record 40 can be classified using posterior probability calculations.

The computer-readable medium 10 of the present invention contains the instructions 12 for a processor 13 that can be described generally as follows:

1. Read a pre-classified data set 16 including a plurality of attributes 20-21, along with its classification code 22 and, for each said attribute, a plurality of descriptors or values 32-33 and 24-26.
2. Calculate a Static Weight 50-51 for each of the plurality of attributes 20-21 in the data set 16.
3. Determine an Interval of Variation 60-61 for each of said plurality of attributes 20-21 in the data set 16.
4. For each new record 40 to be classified:
   a. Calculate a dynamic weight 62-63 for each of said plurality of attribute descriptors or values 32-33 and 24-26 using the static weight 50-51 and the interval of variation 60-61 for each of said plurality of attributes 20-21. This yields the attribute importance score of the current attribute by employing the actual attribute value in the new record. Then transform and normalize the set of attribute importance scores to obtain the dynamic weight of each of said plurality of attributes.
   b. Classify the new record 40 considering the dynamic weight 62-63 of each of said plurality of attribute values. For Naïve Bayes classification, the dynamic weight 62-63 value is used as an exponent of the individual conditional probabilities. The posterior probability based classification is thus as per:

$$C = \mathrm{argmax}_j P(C_j) = \prod_{i=1}^{n} P(A_i \mid C_j)^{w_i}$$

$W_i$s are the Dynamic Weight 62-63 Values for each of the n attributes $A_1$ to $A_n$.

More specifically, the objective of the present invention is achieved by the computer readable medium 10 comprising the instructions 12 for a processor 13 to cause the computer 14 to perform the following transformations of attribute values and attribute descriptors to result in the predictive classification of the new record 40.

Assign Static Weight 50-51 to Attributes 20-21 of Classification Based on Data Set 16
Input: Pre-classified Data set 16 above
Output: Static Weight 50-51 of each Attribute 20-21
1. Calculate overall entropy in the data set 16.
2. For each attribute 20-21 in the data set 16, do the following:
   a. For each distinct value of the attribute 32-33 and 24-26, calculate conditional entropy.
   b. Calculate weighted average of conditional entropy values and call it as the conditional entropy for the attribute 20-21.
   c. Calculate information gain 80-81 of the attribute 20-21 using the conditional entropy for the attribute 20-21 and the overall entropy.

Normalize the Information Gain 80-81 values of all the attributes 20-21, so that they sum up to the number of attributes 20-21. The normalized Information Gain 80-81 values now indicate the static weight 50-51 of each attribute 20-21. For the data set above, the calculations are:

Initial Entropy=−4/8*log(4/8)−2/8*log(2/8)−2/8*log(2/8)=0.4515

Entropy for Company 1(32)=−4/4*log(4/4)−0/4*log(0/4)−0/4*log(0/4)=0

Entropy for Company 2(33)=−2/4*log(2/4)−2/4*log(2/4)=0.3010

Total Entropy after knowledge of VendorName 20=0.5*Entropy($V1$)+0.5*Entropy($V2$)

=0.5*0+0.5*0.3010=0.1505

Information Gain 80 for Vendor Name 20=Initial Entropy−Total Entropy after knowledge of VendorName

=0.4515−0.1505=0.3010

Entropy for "MRO NON-STOCK USAGE"(30)=−2/3*log(2/3)−1/3*log(1/3)−0/3*log(0/3)=0.1174+0.159=0.2764

Entropy for "CAPITAL PROJECT EXP"(29)=−1/3*log(1/3)−1/3*log(1/3)−0/3*log(0/3)=0.159+0.159=0.318

Entropy for "Spare Parts-SAP"(28)=−1/4*log(1/4)−1/2*log(1/2)−1/2*log(1/2)=0.1505+0.1505+0.1505=0.4515

Total Entropy after knowledge of GL Description 21=3/8*0.2764+2/8*0.318+3/8*0.4515=0.3524

Information Gain 81 for GL Description 21=Initial Entropy−Total Entropy after knowledge of GL Description=0.4515−0.3524=0.0991

Un-normalized weights: Vendor Name 20=0.3010, GL Description 21=0.0991

Normalized weights: Vendor Name 20=1.5046, GL Description 21=0.4954

| Static weights to Attributes | | | | |
|---|---|---|---|---|
| Overall Entropy | Attribute Name | Conditional Entropy | Information Gain | Normalized Weights |
| 0.4515 | Vendor Name | 0.1505 | 0.3010 | 1.5046 |
| | GL Description | 0.3524 | 0.0991 | 0.4954 |

Get Interval for Variation about Static Weights 50-51
Input: Data Set 16 above, Static Weights 50-51 of each attribute 20-21
Output: Interval of Variation for each attribute 20-21 in the Data Set 16
1. For each attribute$^i$ 20-21 with static weight 50-51 in the Data Set 16:
   a. Find conditional entropy of each of the descriptors or values 32-33 and 24-26 for current attribute 20-21.
   b. (Note: Since conditional entropy indicates uncertainty about classification given some attribute value or descriptor, the lower the conditional entropy the lower would be uncertainty and hence more important would be the value or descriptor of attribute. Thus, the contribution of this value of attribute in the corresponding attribute's importance is inversely proportional to the conditional entropy.) One way to achieve this is to make Attribute value Importance score 85-86 as an inverse of the corresponding Conditional Entropy.
   c. Q1 is 25 percentile of Attribute value Importance scores 85-86, Q2 is 50 percentile of Attribute value Importance scores 85-86 and Q3 is 75 percentile of Attribute value Importance scores 85-86.
   d. Lower bound scaling factor for interval of variation 60 is calculated as: $LBSF_i=(Q2-Q1)/Q2$.
   e. Lower bound of Interval of Variation 60 for current attribute 20-21 is calculated as: $LB_i=W_i-W_i \cdot LBSF_i$
   f. Upper bound scaling factor for interval of variation 60 is calculated as: $UBSF_i=(Q3-Q2)/Q2$.
   g. Upper bound of Interval of Variation 60 for current attribute 20-21 is calculated as: $UB_i=W_i+W_i*UBSF_i$.

For the data set provided above, the calculations are:
For Vendor Name 20: Q1=2, Q2=5, Q3=10

LBSF=(5−2)/5=0.6, LB=1.5046−1.5046*0.6=0.6018

UBSF=(10−5)/5=2, UB=1.5046+1.5046*2=4.5138

For GL Description 21: Q1=1.5, Q2=3, Q3=5

LBSF=(3−1.5)/3=0.5, LB=0.4954−0.4954*0.5=0.2477

UBSF=(5−3)/3=0.67, UB=0.4954+0.4954*0.67=0.8273

| | Interval of Variation | | | | | | |
|---|---|---|---|---|---|---|---|
| Attribute | Percentile Values | | | Scaling Factor | | Bounds | |
| Name | Q1 (25%) | Q2 (50%) | Q3 (75%) | Lower | Upper | Lower | Upper |
| Vendor Name | 2 | 5 | 10 | 0.6 | 2 | 0.6018 | 4.5138 |

-continued

| Attribute Name | Interval of Variation | | | | | | |
|---|---|---|---|---|---|---|---|
| | Percentile Values | | | Scaling Factor | | Bounds | |
| | Q1 (25%) | Q2 (50%) | Q3 (75%) | Lower | Upper | Lower | Upper |
| GL Description | 1.5 | 3 | 5 | 0.5 | 0.67 | 0.2477 | 0.8273 |

Get Dynamic Weight Values 62-63 for Attribute 20-21 of a New Record 40

Input: new record 40, Interval of Variation 60-61 for each attribute 20-21 in data set 16, data set 16

Output: Dynamic Weights of each attribute 20-21:

1. For each attribute$^i$ 20-21 in the Record 40:

a. Calculate conditional entropy in the pre-classified data set 16 for the descriptors or values of the current attribute 20-21. (Note: Since conditional entropy indicates uncertainty about classification given some attribute value, the lower the conditional entropy the lower would be uncertainty and hence more important would be the value of attribute. Thus, the contribution of this value of attribute in the corresponding attribute's importance score is inversely proportional to the conditional entropy.) One way to achieve this is to make Attribute Importance score 85-86 as an inverse of the corresponding Conditional Entropy.

b. Attribute Importance score 85-86 is then transformed using Linear Transformation in the Interval of Variation 60-61 for current attribute 20-21. The transformed score is calculated using the formula:

$$t_{h_1} = LB_i + \frac{(h_i - L_i)}{(H_i - L_i)} * (UB_i - LB_i)$$

$h_i$=Attribute Importance score 85-86

$L_i$=Lowest of Attribute value Importance scores 85-86 for Attribute$^i$ 20-21 in Data Model $H_i$=Highest of Attribute value Importance scores 85-86 for Attribute$^i$ 20-21 in Data Model $UB_i$=Upper Bound of Interval of Variation 60-61 for Attribute$^i$ 20-21

$LB_i$=Lower Bound of Interval of Variation 60-61 for Attribute$^i$ 20-21

$t_{h_i}$=Attribute importance score in Interval of Variation for Attribute$^i$

2. Normalize the Attribute Importance scores 85-86 of all the attributes 20-21, so that they sum up to the number of attributes 20-21. The normalized values are the dynamic weights 62-63 of each of the attributes.

For Vendor Name

L=0.5, H=4.2

Value=New Record Vendor, Dynamic Weight=3.7

For GL Description

L=0.1, H=3

Value=New Record Supply, Dynamic weight=0.478

Normalized Dynamic Weights:

Vendor Name: 1.77, GL Description: 0.23

| Dynamic Weights of Attributes | | | | |
|---|---|---|---|---|
| Attribute Name | Attribute Value | Attribute Importance | Dynamic Weight to Attribute | Normalized Weights |
| Vendor Name | New Record Vendor | 4 | 3.7 | 1.77 |
| GL Description | New Record Supply | 2.5 | 0.478 | 0.23 |

Thus, the present invention has been described in an illustrative manner. It is to be understood that the terminology that has been used is intended to be in the nature of words of description rather than of limitation.

Many modifications and variations of the present invention are possible in light of the above teachings. For example, any number of attributes and values of attributes may be considered. The instructions may partially be performed by several different computers or in several different stepwise configurations. Therefore, within the scope of the appended claims, the present invention may be practiced otherwise than as specifically described.

What we claim is:

1. A non-transitory computer readable medium comprising instructions to cause a processor to transform attribute values and attribute descriptors to dynamic weights for classifying a new record comprising:

a) determine a static weight for each of a plurality of attributes in a data set wherein said data set includes a plurality of records, each record comprises one of a plurality of descriptors for each of said plurality of attributes;

b) determine an interval of variation about each said static weight;

c) classify a new record comprising assigning a dynamic weight to each said descriptor included in said new record for each of said plurality of attributes and using said dynamic weights for each of said attributes to classify said new record.

2. The non-transitory computer readable medium of claim 1 wherein said static weight for each of said plurality of attributes is determined by calculating overall entropy in the dataset, calculating conditional entropy for each descriptor of said attribute, finding a conditional entropy for said attribute by computing a weighted average of conditional entropy for each descriptor of said attribute, determining information gain of said attribute using the conditional entropy for the attribute and the overall entropy in the data set and normalizing the information gains determined for each of said plurality of attributes to sum to the number of attributes in said plurality of attributes.

3. The non-transitory computer readable medium of claim 1 wherein said interval of variation for each of said plurality of attributes is determined by finding a conditional entropy for each of the plurality of descriptors for said attribute, inverting each conditional entropy to an attribute value importance score to form a group of attribute value importance scores, dividing the group of attribute value importance scores into quartiles, calculating a lower bound scaling factor for the interval of variation as $$LBSF_i = (Q2-Q1)/Q2$$

And an upper bound scaling factor for the interval of variation as $$UBSF_i = (Q3-Q2)/Q2$$

And a lower bound as $$LB_i = W_i - W_i * LBSF_i$$

And an upper bound as $$UB_i = W_i + W_i * UBSF_i.$$

4. The non-transitory computer readable medium of claim 1 wherein said dynamic weight of an attribute in the new record is assigned by calculating conditional entropy of the descriptor of that attribute, inverting said conditional entropy to an attribute value importance score, and, transforming said attribute value importance score according to $$t_{h_1} = LB_i + \frac{(h_i - L_i)}{(H_i - L_i)} * (UB_i - LB_i)$$

$h_i$=Attribute Importance Score
$L_i$=Lowest of Attribute value Importance scores for Attribute$^i$ in dataset
$H_i$=Highest of Attribute value Importance scores for Attribute$^i$ in dataset
$UB_i$=Upper Bound of interval of Variation for Attribute$^i$
$LB_i$=Lower Bound of Interval of Variation for Attribute$^i$
$t_{b_i}$=Attribute importance Score in Interval of Variation for Attribute$^i$ repeating the calculation for each descriptor of each attribute in the new record and thereafter normalizing the transformed group of attribute value importance scores to sum to the number of attributes.

5. The non-transitory computer readable medium of claim 2 wherein said interval of variation for each of said plurality of attributes is determined by finding a conditional entropy for each of the plurality of descriptors for said attribute, in the data set, inverting each conditional entropy to an attribute value importance score to form a group of attribute value importance scores, dividing the group of attribute value importance scores into quartiles, calculating a lower bound scaling factor for the interval of variation as $$LBSF_i = (Q2-Q1)/Q2$$

And an upper bound scaling factor for the interval of variation as $$UBSF_i = (Q3-Q2)/Q2$$

And a lower bound as $$LB_i = W_i - W_i * LBSF_i$$

And an upper bound as $$UB_i = W_i W_i * UBSF_i$$

and said dynamic weight for each attribute in the new record is assigned by calculating conditional entropy in the data set for the descriptor of each said attribute in the new record and inverting each said conditional entropy to create an attribute value importance score for each attribute in the new record, transforming each said attribute value importance score according to $$t_{h_1} = LB_i + \frac{(h_i - L_i)}{(H_i - L_i)} * (UB_i - LB_i)$$

$h_i$=Attribute Importance Score
$L_i$=Lowest of Attribute value importance scores for Attribute$^i$ in dataset
$H_i$=Highest of Attribute value Importance scores for Attribute$^i$ in dataset
$UB_i$=Upper Bound of Interval of Variation for Attribute$^i$
$LB_i$=Lower Bound of Interval of Variation for Attribute$^i$
$t_{h_i}$=Attribute importance score in interval of Variation for Attribute$^i$ and normalizing the transformed group of attribute importance values to sum to the number of attributes.

6. A non-transitory computer readable medium comprising instructions to cause a processor to classify a new record relative to a set of data having a plurality of attributes wherein at least one of said plurality of attributes is described by at least one of a plurality of descriptors and classifying said record comprises causing the processor to determine a static weight for each of the plurality of attributes in said set of data, determine an interval of variation for each of said plurality of attributes caused by the distribution of the plurality of descriptors around said attribute in said set of data, determine a dynamic weight of each of said plurality of attributes in the record, and employ each said dynamic weight to classify said new record.

7. The non-transitory computer readable medium of claim 6 wherein said static weight for each of the plurality of attributes comprises causing the processor to:
 a) calculate overall entropy of said set of data;
 b) calculate an information gain value for each one of said plurality of attributes using a conditional entropy value for each attribute and the overall entropy to create a set of information gain values; and
 c) normalize said set of information gain values to sum up to the number of attributes in the plurality of attributes in said set of data.

8. The non-transitory computer readable medium of claim 7 wherein said conditional entropy value for each attribute comprises causing the processor to:
 a) calculate a conditional entropy value for each one of said plurality of descriptors for each one of said plurality of attributes to create a set of conditional entropy values for each of said plurality of attributes;
 b) calculate a weighted average of each set of conditional entropy values.

9. The non-transitory computer readable medium of claim 6 wherein said interval of variation for each of said plurality of attributes in said set of data comprises causing the processor to:
 a) calculate a conditional entropy value for each descriptor of each of the plurality of attributes to create a set of conditional entropy values;
 b) invert each of said set of conditional entropy values to create a set of attribute value importance scores;
 c) divide said set of attribute value importance scores into four quartiles and determine an upper bound and a lower bound for each of said plurality of attributes in said set of data.

10. The non-transitory computer readable medium of claim 6 wherein said dynamic weight for an attribute of said new record comprises causing the processor to:
 a) calculate a conditional entropy value in the set of data for the descriptor of an attribute in said new record;
 b) invert the conditional entropy value to create an attribute value importance score;
 c) transform said attribute value importance score using linear transformation in the interval of variation for said attribute; and
 d) repeat steps (a) through (c) for each attribute in said new record to create a group of transformed attribute value importance scores.

11. The non-transitory computer readable medium of claim 6 wherein said dynamic weight for an attribute of said new record further comprises causing the processor to normalize the group of transformed attribute value importance scores to sum up to the number of said attributes in said plurality of attributes.

12. The non-transitory computer readable medium of claim 6 wherein said instructions cause the processor to use the dynamic weight of each of said attributes in the new record to calculate posterior probability for a class.

13. The non-transitory computer readable medium of claim 6 wherein said instructions cause the processor to:
 a) calculate a conditional entropy value for each one of said plurality of descriptors for each one of said plurality of attributes to create a set of conditional entropy values for each of said plurality of attributes and calculate a weighted average of each set of conditional entropy values as the conditional entropy for the attribute;
 b) calculate overall entropy of said set of data;
 c) calculate an information gain value for each one of said plurality of attributes using said conditional entropy value for each attribute and the overall entropy to create a set of information gain values;
 d) normalize said set of information gain values to sum up to the number of attributes in the plurality of attributes in said set of data to obtain said static weight for each of said plurality of attributes.

14. The non-transitory computer readable medium of claim 6 wherein said instructions cause the processor to
 a) calculate a conditional entropy value for each descriptor of each of the plurality of attributes in the data set to create a set of conditional entropy values;
 b) invert each of said set of conditional entropy values to create a set of attribute value importance scores;
 c) divide said set of attribute value importance scores into four quartiles and determine an upper bound and a lower bound for each of said plurality of attributes in said set of data to obtain an interval of variation for each of said plurality of attributes in said set of data;
 d) determining said dynamic weight for an attribute of said new record comprise, for each descriptor of an attribute in the new records, calculate conditional entropy in the data model;
 e) for each descriptor of an attribute in the new record, invert the conditional entropy value obtained in step (d) to create an attribute value importance score,
 f) transform each attribute value importance score obtained in step (e) using linear transformation in the interval of variation to form a set of transformed importance values;
 g) create a dynamic weight for each said attribute by normalizing the set of transformed importance values to sum up to the number of said attributes in said plurality of attributes;
 h) employ each said dynamic weight to classify said new record.

15. The non-transitory computer readable medium as claimed in claim 14 wherein said processor is instructed to calculate the posterior probability for a class.

* * * * *